3,145,078
METHOD OF REPROCESSING NUCLEAR FUEL ELEMENTS

Gerald Strickland, Blue Point, Richard Johnson, Shoreham, Frederick L. Horn, Sayville, and Charles B. Bartlett, West Islip, N.Y., assignors to the United States of America as represented by the United States Atomic Energy Commission
No Drawing. Filed May 7, 1962, Ser. No. 193,026
5 Claims. (Cl. 23—14.5)

This invention relates to an improvement in the dissolution of nuclear fuel elements. More particularly, this invention relates to a solvent used in the dissolution of nuclear fuel elements containing uranium, and to the volatile recovery of said uranium and plutonium.

The fuel elements referred to in this invention are of the type used in nuclear reactors. These fuel elements are usually clad with a metal or alloy such as, zirconium, stainless steel, aluminum, zircaloy-2, etc. However, before the fuel elements can be reprocessed, to separate the uranium and plutonium from fission products, the cladding must be removed from the spent fuel element:

The decladding operation can be carried out by one of three separate generic processes. These processes have been classified as; (1) mechanical decladding; (2) chemical decladding; and (3) simultaneous chemical decladding and fuel dissolution. This invention relates to a process which is classified in the latter of these generic classifications.

In the reprocessing of neutron irradiated nuclear fuel elements (spent fuel elements) to separate and recover the uranium from the nuclear reaction products, a highly advantageous method comprises a method the initial step of which involves dissolving the contaminated uranium in a non-aqueous halogen fluoride in the liquid phase. The dissolution step effects a partial phase separation of the uranium and certain other contaminants by converting the uranium to a soluble and volatile uranium hexafluoride compound. When this is followed by one or more distillation steps, the volatile uranium hexafluoride can be separated from the solvent and any other impurities. Such a fluoride-volatility process for the recovery of uranium is described in U.S. Patent No. 2,830,873, dated April 15, 1956.

The method of separating the uranium from fission products using a halogen fluoride is thus feasible for use once the cladding from the neutron irradiated nuclear fuel element has been removed. Many processes have been used, and are being used, for the recovery of uranium from spent fuel elements in which the uranium is clad with or otherwise combined with zirconium, zircaloy, aluminum, stainless steel and other types of claddings. However, to date no universal or substantially universal solvent has been found to allow the decladding of the fuel element and then the subsequent conversion of the uranium present to its soluble and volatile form, uranium hexafluoride, by the addition of a halogen fluoride to the system. The reason for this is that usually these claddings combine with the solvent to form a tenacious coating on the cladding surface.

It is, therefore, an object of this invention to provide an improvement in a process for the recovery of uranium from spent fuel elements in which the uranium or uranium oxide is mixed with, clad with or alloyed with, zirconium, zirconium-alloy, stainless steel, aluminum or a carbide.

A further object of this invention is to provide an improvement in the process which effects dissolution of spent fuel elements of the type described at relatively low pressures and under relatively controllable conditions. A still further object of this invention is to provide an improvement in the process for recovering uranium in a volatile form from spent fuel elements of the type in which uranium is clad with or alloyed with, zirconium, zirconium-alloys, stainless steel, aluminum or a carbide. A still further object of this invention is an improvement in the process for recovering uranium from spent fuel elements by which the volume of waste fission products is minimized and wherein said fission products are in concentrated and easily handled form. Still another object of this invention is to provide a continuous process for the recovery of uranium from a mixture containing uranium and zirconium, zirconium-alloy, stainless steel, aluminum or a carbide.

The present invention is predicated on the discovery that solvents which will produce an $NOF \cdot XHF$ solution can be used to declad spent uranium fuel elements and also dissolve the fuel material to form a soluble uranium complex compound which can be suitably treated with a halogen fluoride or fluorine to form the volatile uranium hexafluoride or treated with NOF gas to separate the uranium complex from other contaminants.

Certain acid fluorides, of which hydrogen fluoride (HF) and difluorosphosphoric acid ($HPO_2F_2$) are examples, react with uranium under anhydrous conditions. The reaction of stainless steel, aluminum and zirconium with these acids results in the formation of an essentially insoluble fluoride salt. It is known that the usual cladding metals used for uranium fuel elements, i.e., zirconium, zirconium-alloys, stainless steel, aluminum and carbides, prevent uranium from being dissolved from its cladding material by acid fluorides. The cladding metals form an insoluble, tightly adherent coating that precludes a further reaction to effect recovery of the uranium.

In accordance with the present invention a solvent is used to separate uranium from its cladding and the fission products which is an improvement over a similar process disclosed in U.S. Patent No. 3,012,849. We have found a solvent for use in this process which not only is effective in the separation of uranium from zirconium, but can effectively separate uranium from claddings of zirconium, zirconium-alloys, stainless steel, aluminum and carbides.

The uranium is converted to a soluble uranium fluoride complex compound, whereas the cladding forms a complex of limited solubility. The uranium complex formed has been identified as a complex with the formula $NOUF_6$. The slightly soluble cladding compound is then separated from the solution by conventional phase separation methods which may include filtration or decantation. The uranium containing filtrate is then evaporated to dryness. The solid residue which contains uranium and a small percentage of other metal contaminants is then treated with a halogen fluoride in the liquid phase or with fluorine gas. The uranium is thereby converted to the volatile uranium hexafluoride compound. The uranium hexafluoride ($UF_6$) so formed is separated from the solvent and from any contaminating volatile fluorides by one or more distillation steps following conventional distillation practice. Another means of separating the $NOUF_6$ from the remaining fission products compounds formed is to treat the solid residue with NOF gas under heat and pressure and upon condensation recover the $NOUF_6$ complex free of contaminants. The thus recovered $NOUF_6$ may then be discomposed to recover $UF_4$ by heating.

For a more complete understanding of the invention, reference may be made to the following description. In the composition to be treated, the uranium may be uranium metal or a uranium compound such as one of its oxides. In the embodiment to be described, it will be assumed that the starting material is a neutron irradiated fuel element wherein such element has a uranium core and a zirconium cladding. The solvent to be used to de-clad the uranium core may be selected from the group consisting of $N_2O_3$—HF and NOF—3HF.

To prepare NOF—3HF (B.P. 95° C.), NOCl gas is bubbled through liquid anhydrous hydrogen fluoride and insoluble HCl gas is vented. The resulting solution is then distilled at 90° C. for an hour and a half to remove NOF—6HF (B.P. 65° C.) and excess HF. The purity of such a solution of NOF—3HF is estimated to be 96% based on freezing point depression. The resulting solution is an azeotrope between 3HF and 6HF with the nominal composition NOF—3.1HF, hereafter called NOF—3HF.

The mixing of $N_2O_3$ and HF is another way of producing NOF—XHF. The $N_2O_3$ was prepared by bubbling NO gas into liquid $N_2O_4$ at 9° C. The desired mixture was then prepared by adding the $N_2O_3$ to the HF; this operation was performed at Dry Ice temperature (—78° C.) in order to minimize the dissociation of $N_2O_3$. The reaction of the $N_2O_3$—HF solution which produces the NOF—XHF solution can be seen by the following reaction:

$$N_2O_3 + nHF \rightarrow 2NOF-XHF + H_2O-HF$$

Thus, it is evident that a solution of NOF—XHF, or any system which produces this solvent, is the solvent of this invention and "X" may be 3, 6 or probably 12. The spent fuel element containing uranium and zirconium is dissolved in the liquid phase in a solvent selected from the group consisting of NOF—3HF and $N_2O_3$—HF. The zirconium begins to dissolve at a temperature in the range of from 40° to 60° F. Higher temperatures up to 200° F. may also be used depending on the pressure rating of the equipment. The uranium will form a soluble complex $NOUF_6$, while the zirconium forms a complex of limited solubility.

The liquid and solid phases are then separated by conventional phase sepaartion methods. Any of the well known methods of separating solids from liquids, such as filtration, centrifugation, fractional crystallization, etc., may be employed for this purpose. Filtration has been found to be a desirable separation procedure. The solvent is then evaporated at a temperature in the range of 70° to 300° F.

The solids are then treated with bromine trifluoride ($BrF_3$) to convert the uranium to the volatile uranium hexafluoride. It is desirable to carry out the conversion of the uranium to the hexafluoride at a temperature between 100 and 300° and preferably at a temperature of about 300° F. The volatile uranium hexafluoride can then be separated from any residual zirconium fluoride, fission product fluorides, bromine trifluoride and other volatile uranium contaminants, by distillation to yield a uranium hexafluoride product which is substantially free of these contaminants.

The materials of construction for reactors to contain the solvents of this invention do not have to be selected with great care. It has been found that this system is only slightly corrosive to metals such as Monel, or other high nickel alloys.

Having described the process, it may be further illustrated by the following examples:

EXAMPLE I

This experiment demonstrates that uranium containing fuel elements having a cladding of zirconium or alloys thereof, can be dissolved in a liquid phase medium at a practical rate and that the uranium can be separated as a pure uranium hexafluoride product.

An unirradiated fuel plate section having zircaloy-2 cladding and containing approximately 4% uranium by weight (about 280 mgm.) was immersed in a liquid solution of 1.91 moles HF and 0.0955 mole $N_2O_3$ in a polytetrafluoroethylene container. The container was provided with an internal Monel metal cooling coil for controlling the solution temperature. The solution, with the sample immersed therein, was heated to a temperature in the range of from 80° to 100° F.

After the sample was dissolved, the solution was transferred to another polytetrafluoroethylene vessel where evaporation took place. A greenish-white powder, which by X-ray diffraction was identified as $NOUF_6$, was collected. Twenty-five ml. of bromine trifluoride was then added to the residue and the solution was then distilled.

The $UF_6$ collected was then analyzed for uranium by colorimetric methods after hydrolysis of uranium hexafluoride with nitric acid to form a uranyl nitrate. A total of 95% of the uranium was volatized.

EXAMPLE II

The rate of dissolution of zirconium, uranium oxide, 304-stainless steel, and aluminum in $N_2O_3$—HF solution is shown by this example. The metal specimen was placed in a Monel metal reaction vessel and the vessel was then evacuated. The system was chilled with liqiud nitrogen to a temperature of about 0° C. About 20–25 ml. $N_2O_3$—HF solvent, sufficient to cover the specimen, was then pressure-transferred into the reaction vessel. A resistance wire heating jacket was then placed over the reaction vessel and the temperature raised to the desired value and maintained by a temperature controller.

Table I gives the results of these runs at different mol ratios and at various temperatures.

Table I

RATES OF DISSOLUTION OF STAINLESS STEEL, ZIRCONIUM, ALUMINUM AND $UO_2$ IN $N_2O_3$—HF SOLVENT

| $N_2O_3$—HF, Mol Ratio | Material Dissolved | Temp., °F. | Time, Min. | Dissolution Rate | |
|---|---|---|---|---|---|
| | | | | mg./cm.² min. | Mils/ Hr. |
| 1:15 | $UO_2$ | 75–100 | 30 | 13.1 | 29 |
| 1:20 | $UO_2$ | 150–270 | 30 | 14.2 | 31 |
| 1:15 | SS-304 | 75–100 | 30 | .21 | .62 |
| 1:20 | SS-304 | 150–270 | 50 | .736 | 2.2 |
| 1:20 | Zr | 100–160 | 15 | 7.0 | 25 |
| 1:20 | Zr | 75–200 | 35 | 5.2 | 19 |
| 1:20 | Aluminum | 150 | 60 | 1.7 | 15 |
| 1:20 | Aluminum | 200 | 65 | 8.3 | 72 |

From the above set of data it can be seen that satisfactory dissolution is obtained with zirconium, 304-stainless steel, and uranium oxide in $N_2O_3$—HF solvent.

The thickness of stainless steel-304 on a uranium fuel element is approximately from 10 to 15 mils. It is considered to be within a satisfactory range if the cladding material can be removed from the uranium core within a period of time from 8 to 10 hours. As can be seen from the above table, the stainless steel can be removed within a few hours.

Uranium oxide pellets have a diameter of about ½" and are about ½" long. It can be seen that the dissolution of these pellets can be carried out using this solvent system within a satisfactory period of time. Thus, it is clearly evident that when a stainless steel clad $UO_2$ fuel element is processed the desired dissolution will take place in a matter of hours.

EXAMPLE III

This example demonstrates the solubility of zirconium, stainless steel, aluminum and uranium oxide in a solution of NOF—3HF prepared as herein above set forth. The procedure set forth in Example II was followed except that the solvent was NOF—3HF. The results of these dissolution studies are set forth in Table II.

Table II
DISSOLUTION OF ZIRCONIUM, STAINLESS STEEL, URANIUM OXIDE AND ALUMINUM IN NOF—3HF

| Material | Temp., °F. | Dissolution Rate mg./cm.² min. | Dissolution Rate Mils/Hr. | Time of Reaction |
|---|---|---|---|---|
| 304–SS | 150 | 0.3 | 0.89 | ½ Hr. |
| 304–SS | 230 | 0.9 | 2.7 | ½ Hr. |
| 304–SS | 300 | 3.0 | 8.9 | 1.5 Hr. |
| 2S Al | 145 | 0.25 | 2.2 | 40 min. |
| 2S Al | 190 | 3.3 | 29 | 21 min. |
| UO₂, ceramic | 158 | 22 | 48 | 15 min. |
| UO₂, ceramic | 219 | 46 | 98 | 15 min. |
| Zr | 95 | >21 | >76 | 15 min. |
| Zr | 75–200 | 74 | 270 | 13 min. |

From the above table it is clearly evident that the cladding of these materials can be removed from uranium within a satisfactory period of time and the uranium separated in accordance with Example I.

EXAMPLE IV

This example illustrates that $UF_6$, can be volatilized after uranium oxide is dissolved in a NOF—3HF solvent. The volatility of the uranium salt produced in this solvent was determined using $NOUF_6$ salt formed from uranium metal. A gram of uranium metal was dissolved in 30 ml. of solvent during a 1.5 hour period at 120° C. The solution was evaporated and vacuum dried prior to treatment with 31 ml. of $BrF_3$ at 350° F. for three hours. All volatile matter was condensed and the uranium volatility, based on uranium retained, was 99.3%. Thus the salt produced in NOF—3HF can be readily fluorinated to $UF_6$ with $BrF_3$.

EXAMPLE V

This example illustrates the dissolution behavior of uranium carbide in NOF—3HF solvent.

A 3-gram piece of UC was heated to 93° C. in 25 mol of solution and a slight exothermic reaction was noted 3 minutes later. The temperature increased to 104° C. in 2 minutes, the reaction was then stopped by cooling the reaction vessel. The UC was completely disintegrated in the course of a 20-minute dissolution. The average rate of dissolution was 3.2 mg./cm.² min. (5.5 mils./hr.). The complex uranium compound produced was identified as $NOUF_6$ by its X-ray powder pattern

EXAMPLE VI

This example illustrates a method of separating the $NOUF_6$ compound from other fission product salts without the use of a halogen fluoride.

NOF—3HF gas was passed over a reaction vessel holding $NOUF_6$ salt being heated in an electric furnace at a temperature of between 450° and 500° C. The reaction will proceed at 5 and 500 mm. Hg absolute pressure of NOF—3HF, however greater efficiency occurs at intermediate pressures of 100 to 200 mm. Hg.

The effluent gases were cooled in a nitrogen cold trap. This trap was removed and washed with dilute $HNO_3$. Analytical studies showed that 99% of the uranium was recovered, thus indicating that the uranium compound $NOUF_6$ can be volatilized by this process and successfully recovered. A total of 447 mg. of $NOUF_6$ was volatilized by one ml. of NOF—3HF in one hour at 476° C.

EXAMPLE VII

This example illustrates that NOF gas passed over $NOUF_6$ salt can colatilize the uranium and recover approximately 95% thereof. A batch of 570.2 mg. of this salt was placed in a reaction vessel. NOF gas was then passed over the vessel and the volatile product collected in a nitrogen cold trap. The analytical results indicated that 338 mg. of U was recovered. As there are 354 mg. of U in 570.2 mg. of $NOUF_6$ this indicates a recovery of U of about 95%. The $NOUF_6$ was completely volatilized by 8 ml. of liquid NOF in one hour at 476° C.

Since many embodiments might be made in the present invention and since many changes might be made in the embodiment described, it is to be understood that the foregoing description is to be interpreted as illustrative only and not in a limiting sense.

We claim:

1. A process for recovering of uranium from clad uranium bearing nuclear fuel elements, said elements being clad with a material selected from the group consisting of zirconium, stainless steel, carbides and aluminum, comprising intimately contacting and reacting the clad element with liquid NOF.X(HF), wherein X is an average number ranging from about 3 to about 12 while maintaining the temperature of the liquid at a temperature ranging from about 80° F. to about 100° F. until all of the clad element has been reacted with said liquid, separating the liquid portion of the reaction products, evaporating the separated liquid portion to dryness, thereafter recovering the uranium from the solute remaining from said evaporated liquid portion.

2. The process of claim 1 wherein said clad element is clad with zirconium.

3. The process of claim 2 wherein X is 3.1.

4. A process for recovering uranium from clad uranium bearing nuclear fuel elements, said elements being clad with a material selected from the group consisting of zirconium, stainless steel, carbides and aluminum, comprising,
   (a) intimately contacting and reacting the clad element with liquid NOF.X(HF), wherein X is an average number ranging from about 3 to about 12, while maintaining the temperature of the liquid at a temperature ranging from about 80° F. to about 100° F. until all of the clad element has been reacted with said liquid,
   (b) separating the liquid portion of the reaction products,
   (c) evaporating the separated liquid portion to dryness,
   (d) intimately contacting the solute remaining from said evaporated liquid portion with gaseous NOF until all of the $NOUF_6$ complex contained in the solute is adsorbed in said NOF gas, and separating the gas from the solute,
   (e) condensing the $NOUF_6$ complex adsorbed in said NOF gas,
   (f) fluorinating the condensed $NOUF_6$ complex until all of the uranium contained in the $NOUF_6$ complex is converted to uranium hexafluoride, thereafter recovering the uranium from the uranium hexafluoride.

5. The process of claim 4 wherein X is 3.1.

References Cited in the file of this patent
UNITED STATES PATENTS

| | | |
|---|---|---|
| 1,717,951 | Taylor | June 18, 1929 |
| 2,830,873 | Katz et al. | Apr. 15, 1958 |
| 3,012,849 | Horn | Dec. 12, 1961 |

OTHER REFERENCES

Reactor Fuel Processing, vol. 4, No. 4, pp. 36, 37, October 1961.